(12) United States Patent
Oikawa et al.

(10) Patent No.: US 11,245,343 B2
(45) Date of Patent: Feb. 8, 2022

(54) VIBRATION WAVE MOTOR AND DRIVING DEVICE

(71) Applicant: CANON KABUSHIKI KAISHA, Tokyo (JP)

(72) Inventors: Makoto Oikawa, Yokohama (JP); Ryo Yamasaki, Tokyo (JP); Kazuharu Osawa, Kawasaki (JP); Shunsuke Ninomiya, Yokohama (JP); Ryo Abe, Funabashi (JP); Kenta Takai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 16/440,388

(22) Filed: Jun. 13, 2019

(65) Prior Publication Data

US 2019/0393807 A1    Dec. 26, 2019

(30) Foreign Application Priority Data

Jun. 20, 2018  (JP) .............................. JP2018-117034

(51) Int. Cl.
*H02N 2/00* (2006.01)
*H02N 2/02* (2006.01)

(52) U.S. Cl.
CPC ......... *H02N 2/0015* (2013.01); *H02N 2/0085* (2013.01); *H02N 2/026* (2013.01)

(58) Field of Classification Search
CPC .... H02N 2/0015; H02N 2/0085; H02N 2/026; H02N 2/0055; G02B 7/08
See application file for complete search history.

(56) References Cited

U.S. PATENT DOCUMENTS

| 9,091,805 | B2 | 7/2015 | Yamsaki et al. |
| 9,143,058 | B2 | 9/2015 | Oikawa et al. |
| 9,158,083 | B2 | 10/2015 | Oikawa et al. |
| 9,641,104 | B2 | 5/2017 | Yamasaki et al. |

(Continued)

FOREIGN PATENT DOCUMENTS

JP    2016-100928 A    5/2016

OTHER PUBLICATIONS

U.S. Appl. No. 16/394,398, Shunsuke Ninomiya, Ryo Yamasaki, Makoto Oikawa, Kazuharu Osawa, Ryo Abe, Kenta Takai, filed Apr. 25, 2019.

(Continued)

*Primary Examiner* — Emily P Pham
(74) *Attorney, Agent, or Firm* — Venable LLP (57) ABSTRACT

A vibration wave motor includes a vibrator, a friction member having a sliding surface, a guide member, a flexible substrate, and a fixing member configured to fix the friction member, the guide member, and the flexible substrate. The vibrator and the friction member move relative to each other in a predetermined direction. The fixing member includes a substrate-fixing portion configured to fix the flexible substrate, which includes a joint portion, an extending portion extending along the predetermined direction, a bent portion configured to reverse and turn back the extending portion, and a fixed portion to be fixed to the substrate-fixing portion. The flexible substrate is fixed on a surface of the substrate-fixing portion provided in a direction opposite to a direction in which the vibrator is brought into pressure-contact with the friction member.

8 Claims, 5 Drawing Sheets

(56) References Cited

U.S. PATENT DOCUMENTS

| | | |
|---|---|---|
| 10,069,440 B2 | 9/2018 | Osawa et al. |
| 10,103,650 B2 | 10/2018 | Ninomiya |
| 10,171,008 B2 | 1/2019 | Nishitani et al. |
| 10,193,473 B2 | 1/2019 | Yamasaki et al. |
| 10,379,313 B2 | 8/2019 | Ninomiya |
| 2018/0097459 A1 | 4/2018 | Osawa |
| 2018/0183355 A1* | 6/2018 | Noguchi ............. H02N 2/0095 |
| 2019/0181777 A1 | 6/2019 | Nakabayashi et al. |

OTHER PUBLICATIONS

U.S. Appl. No. 16/418,514, Kenta Takai, Ryo Yamasaki, Makoto Oikawa, Kazuharu Osawa, Kazuharu Osawa, Shunsuke Ninomiya, Ryo Abe, filed May 21, 2019.

* cited by examiner

VIBRATION WAVE MOTOR AND DRIVING DEVICE

BACKGROUND OF THE INVENTION

Field

The present disclosure relates to a vibration wave motor and a driving device.

Description of the Related Art

In Japanese Patent Application Laid-Open No. 2016-100928, there is disclosed an ultrasonic motor having a configuration in which a movable portion including a vibrating plate and a piezoelectric element moves, and a flexible substrate to be connected to the piezoelectric element is turned back.

In the ultrasonic motor disclosed in Japanese Patent Application Laid-Open No. 2016-100928, a surface, on which the turned-back portion of the flexible substrate is pasted to the base member, is provided on a surface on the movable portion side of the base member. Therefore, it is required that the turned-back portion be fixed to the base member in a narrow space defined between the movable portion and the base member, which results in poor workability.

SUMMARY OF THE INVENTION

An object of the present disclosure is to provide a vibration wave motor which is improved in workability at the time of manufacturing the vibration wave motor.

There is provided a vibration wave motor including: a vibrator including a piezoelectric element and a vibrating plate; a friction member having a sliding surface with which the vibrator is held in pressure-contact in a first direction by a pressurizing force; a guide member, which is disposed on a side opposite to a side being the sliding surface of the friction member, and is configured to guide relative movement between the vibrator and the friction member; a flexible substrate configured to apply voltage to the vibrator; and a fixing member configured to fix the friction member, the guide member, and the flexible substrate; wherein the vibrator and the friction member move relative to each other in a second direction, wherein the fixing member includes a substrate-fixing portion configured to fix the flexible substrate, wherein the flexible substrate includes: a joint portion to be joined to the piezoelectric element; a first extending portion extending along the second direction; a bent portion configured to reverse and turn back the first extending portion; and a fixed portion to be fixed to the substrate-fixing portion, and wherein the flexible substrate is fixed on a surface of the substrate-fixing portion provided in a direction opposite to a direction in which the vibrator is brought into pressure-contact with the friction member.

A vibration wave motor, which is improved in workability at the time of manufacturing the vibration wave motor, can be provided.

Further features of the present disclosure will become apparent from the following description of exemplary embodiments with reference to the attached drawings.

DESCRIPTION OF THE EMBODIMENTS

First Embodiment

In the drawings, a direction of relative movement between a vibrator 104 and a friction member 101 (described later) is defined as an X-direction (second direction), and a pressurizing direction in which the vibrator 104 is brought into pressure-contact with the friction member 101 by springs 110 is defined as a Z-direction (first direction). Further, a direction orthogonal to the X-direction and the Z-direction is defined as a Y-direction (third direction).

Figure 1:
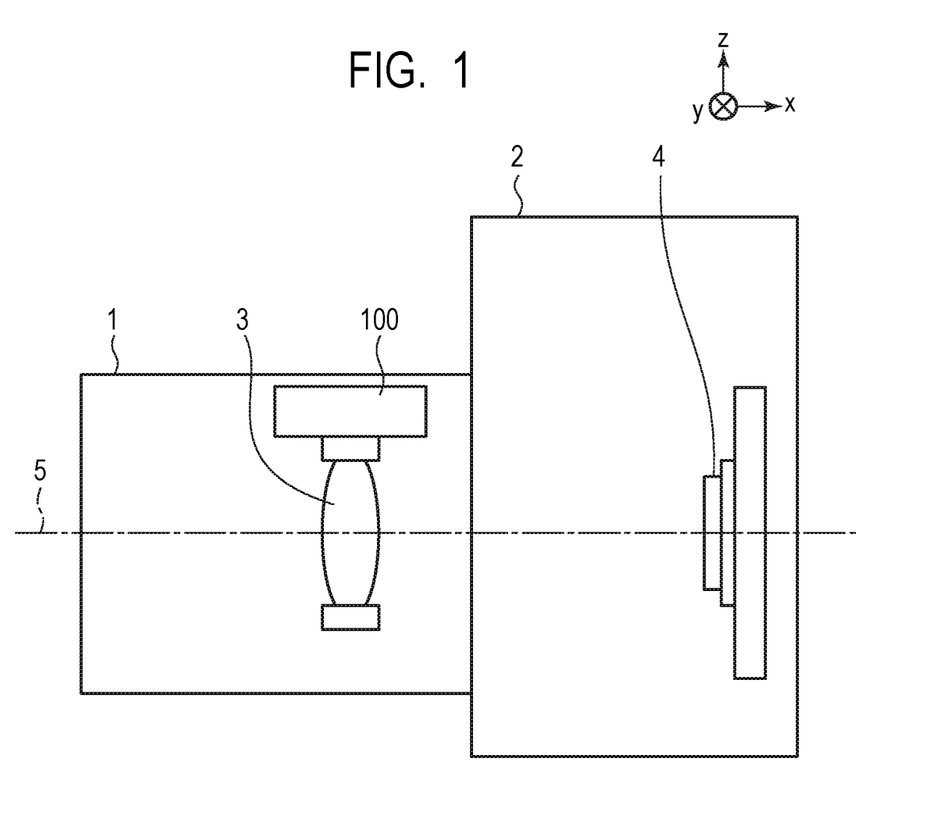
FIG. 1 is a view for illustrating a configuration of an imaging apparatus.

FIG. 1 is a view for illustrating a configuration of an imaging apparatus on which a vibration wave motor 100 (ultrasonic motor) is mounted. In this description, the case in which the vibration wave motor 100 is mounted on the imaging apparatus is described. However, the present disclosure is not limited thereto. The present disclosure is applicable to a driving device including a driven member driven by the vibration wave motor 100. Further, the imaging apparatus including an imaging lens 1 and a camera body 2 integrated with each other, which are described later, is described. However, the imaging lens 1 may be a replaceable lens.

In FIG. 1, the imaging lens 1 and the camera body 2 form a main body of the imaging apparatus. Inside the imaging lens 1, a focus lens 3 is coupled to the vibration wave motor 100. Movement of a vibrator 104 forming the vibration wave motor 100 allows the focus lens 3 to move in a direction substantially parallel to an optical axis 5. At the time of imaging, the focus lens 3 moves in the direction substantially parallel to the optical axis 5, and an object image is formed at a position of an imaging element 4 so that a focused image can be generated.

Figure 2A:
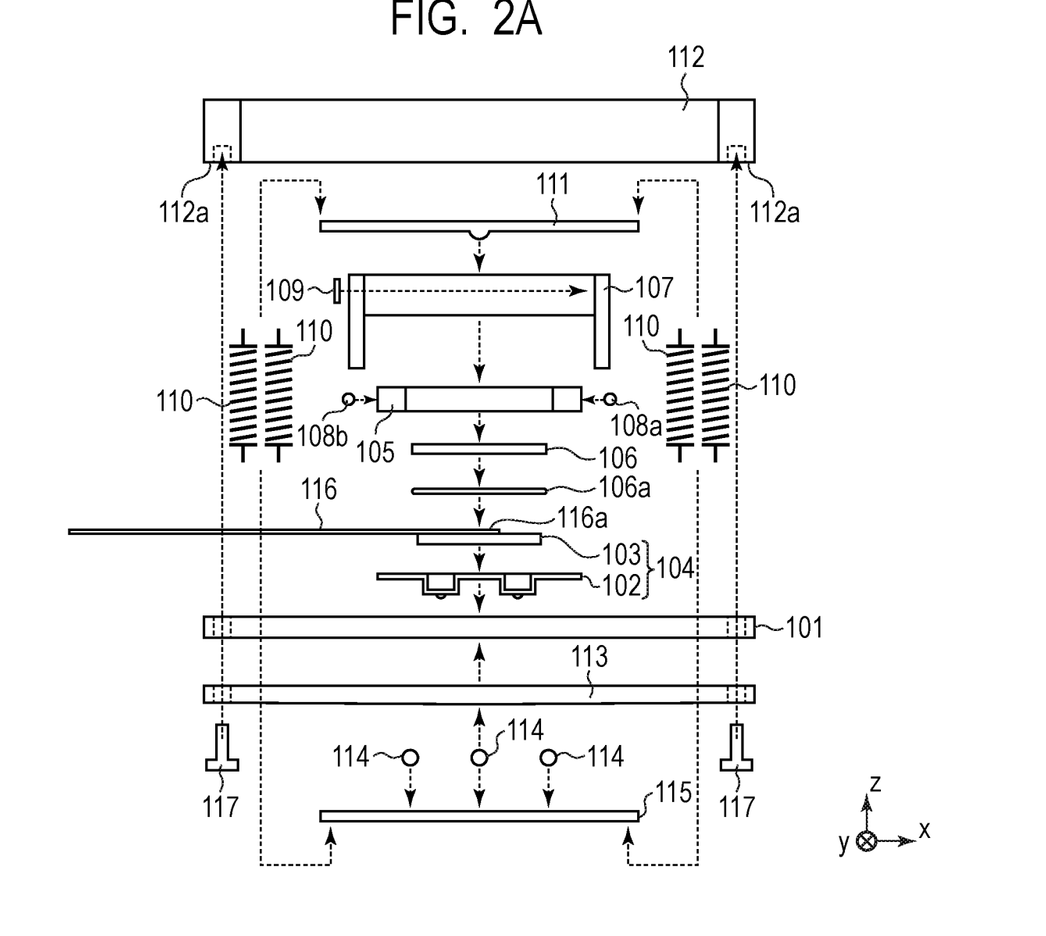
FIG. 2A and FIG. 2B are views for illustrating a configuration of a vibration wave motor (100).
Figure 2B:
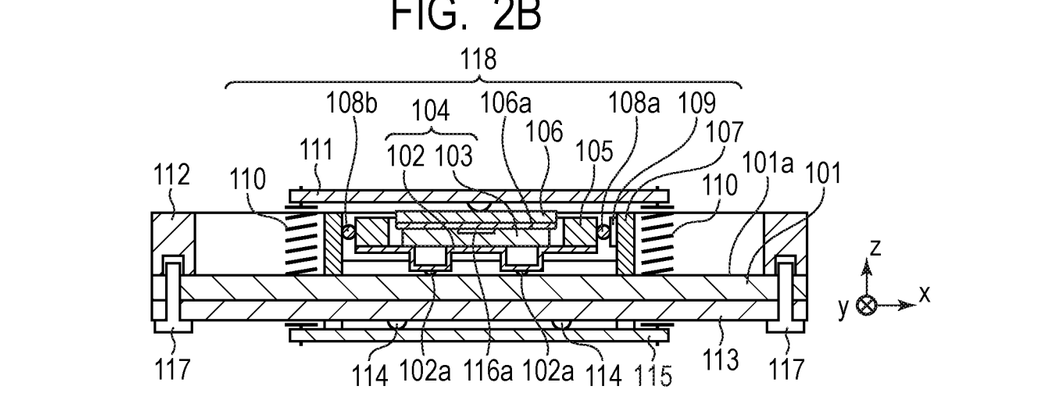

FIG. 2A and FIG. 2B are views for illustrating a configuration of the vibration wave motor 100. FIG. 2A is an exploded view in which members are separated, and FIG. 2B is a sectional view around a central portion taken along an XZ-plane. The vibration wave motor 100 of this embodiment is formed of members described below.

The vibrator 104 includes a vibrating plate 102, which is a vibrating body having elasticity, and a piezoelectric element 103. The vibrating plate 102 and the piezoelectric element 103 are fixed to each other with a known adhesive or the like. A joint portion 116a of a flexible substrate 116 is press-joined to the piezoelectric element 103. Through application of a high frequency voltage to the piezoelectric element 103 via the flexible substrate 116, the vibrator 104 is excited by vibrations (ultrasonic wave vibrations) at a frequency in a high frequency region.

The vibrator 104 is fixed to a first retaining member 105 with a known adhesive or the like, but the fixing method thereof is not limited as long as the vibrator 104 is fixed to the first retaining member 105. A second retaining member 107 is coupled to the first retaining member 105 through intermediation of rollers 108a, 108b and a plate spring 109 (described later). A guide member 113 is a member configured to guide relative movement between the vibrator 104 and the friction member 101, which moves relative to the vibrator 104 in the X-direction. The guide member 113 is held in abutment against the friction member 101, and is fixed to fixing portions 112a of a fixing member 112 with screws 117. The fixing member 112 is fixed to a second fixing member 119 (described later) with screws or the like.

The plurality of springs 110 couple an urging member 111 and a movable guide member 115 to each other at four points, and the vibrator 104 is held in pressure-contact with the friction member 101 by a pressurizing force of the plurality of springs 110. A buffer member 106a is pasted to a base plate 106, and the base plate 106 is disposed between the piezoelectric element 103 and the urging member 111. The buffer member 106a and the base plate 106 prevent direct contact between the urging member 111 and the piezoelectric element 103, to thereby prevent damage on the piezoelectric element 103.

The vibrating plate 102 includes contact portions 102a, and the contact portions 102a are held in contact with a sliding surface 101a of the friction member 101 in a state of being pressurized and urged by the pressurizing force of the above-mentioned springs 110. In a state in which the vibrating plate 102 and the piezoelectric element 103 adhere to each other, when a high frequency voltage is applied to the piezoelectric element 103, a resonance phenomenon occurs in the vibrator 104. On this occasion, two types of standing waves are generated in the vibrator 104, to thereby cause a substantially elliptic motion of the contact portions 102a of the vibrating plate 102.

Figure 5A:
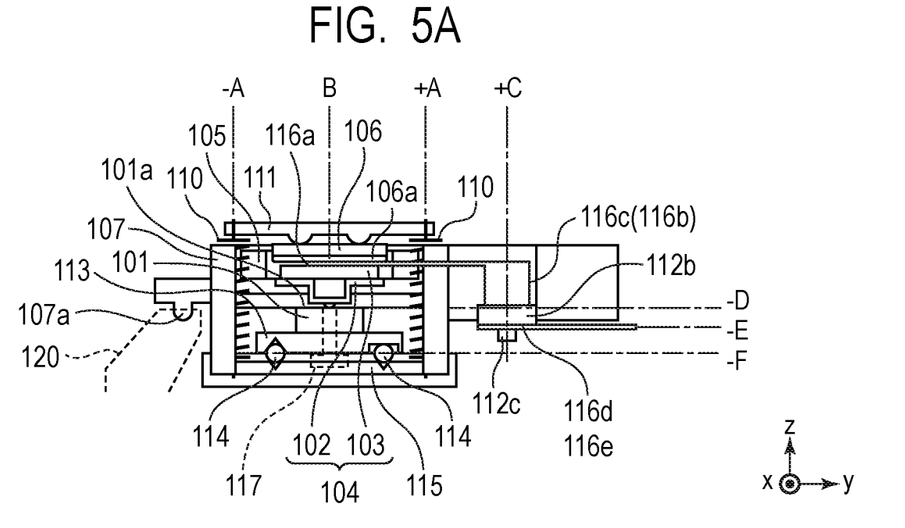
FIG. 5A and FIG. 5B are views for illustrating a position of a flexible substrate-fixing portion (112b).

Although the second retaining member 107 and the movable guide member 115 are fixed to each other with screws or the like (not shown), the fixing method thereof is not limited as long as the second retaining member 107 and the movable guide member 115 are fixed to each other. The movable guide member 115 has three V-shaped grooves as movement-side guide portions. Rolling balls 114 are engaged in respective grooves. Meanwhile, the guide member 113 also has three grooves as fixed-side guide portions. The rolling balls 114 roll while being sandwiched between the movement-side guide portions of the movable guide member 115 and the fixed-side guide portions of the guide member 113. In this embodiment, among the three grooves of guide member 113, two grooves are V-shaped grooves and one groove is a bottomed flat groove. However, the grooves may have other configurations as long as the rolling balls 114 can roll therein. Further, the second retaining member 107 includes, as illustrated in FIG. 5A, a spherical protrusion portion 107a which is a power takeout portion to be coupled to a driven body. The spherical protrusion portion 107a is held in abutment against a coupling member 120 to be coupled to the driven body, and the coupling member 120 applies an urging force in a +Z-direction to the spherical protrusion portion 107a. That configuration enables the second retaining member 107 and the focus lens 3 to move integrally in the X-direction. The coupling member 120 is connected to the focus lens 3 described with reference to FIG. 1. It is noted that the vibrator 104, the second retaining member 107, the base plate 106, the first retaining member 105, the rollers 108a, 108b, the plate spring 109, the springs 110, the urging member 111, and the movable guide member 115 are integrated to form a movable portion 118.

Next, the pressurizing force generated by the springs 110 is described. The plurality of springs 110 are disposed at the four points to surround the vibrator 104, and the urging member 111 and the movable guide member 115 are coupled through intermediation of respective spring hook portions. The pressurizing force of the springs 110 is an urging force which pressurizes the vibrator 104 against the friction member 101 in the Z-direction via the base plate 106 on which the buffer member 106a is pasted. The contact portions 102a of the vibrating plate 102 are held in contact with the friction member 101 in a pressurized state. Further, the rolling balls 114, in the state of being sandwiched between the guide member 113 and the movable guide member 115, are caused to roll in that state by the pressurizing force of the springs 110. That configuration reduces a frictional sliding load caused by the pressurizing force of the springs 110.

In that pressure-contact state, when a high frequency voltage, which is a driving voltage, is applied to the piezoelectric element 103, the substantially elliptic motion occurred occurring in the vibrator 104 is efficiently transmitted to the friction member 101. As a result, the movable portion 118 moves in the +X-direction or in the −X-direction with respect to the friction member 101 and the fixing member 112 on the fixed side.

With reference to FIG. 2B, a coupling member between the first retaining member 105 and the second retaining member 107 is described. In FIG. 2B, the rollers 108a, 108b are disposed between the first retaining member 105 and the second retaining member 107. Further, the plate spring 109 having a predetermined urging force in the X-direction, which is a direction of relative movement of the vibrator 104, is disposed between the second retaining member 107 and the roller 108a. The rollers 108a, 108b are movable in the pressurizing direction (Z-direction) of the springs 110. The urging force of the plate spring 109 urges the first retaining member 105 in the −X-direction via one roller 108a, and urges the second retaining member 107 in a +X-direction. With that configuration, another roller 108b is sandwiched between the first retaining member 105 and the second retaining member 107.

With the configuration as described above, backlash does not occur in the direction of relative movement of the movable portion 118, and the movable portion 118 is movable by rolling of the rollers 108a, 108b in the pressurizing direction of the springs 110. Accordingly, the first retaining member 105 can be coupled to the second retaining member 107 without inhibiting the drive of the vibrator 104. The plate spring 109 is used as an elastic member forming the coupling member between the first retaining member 105 and the second retaining member 107. However, other members may be used as long as the member which can eliminate backlash is used.

The urging force of the plate spring 109 described above is set to be larger than an inertial force caused by acceleration and deceleration generated when the vibrator 104 starts driving and stops driving. With that configuration, the vibrator 104 and the first retaining member 105 can achieve stable drive control without occurrence of relative displacement in the moving direction caused by the inertial force at the time of driving.

Figure 3A:
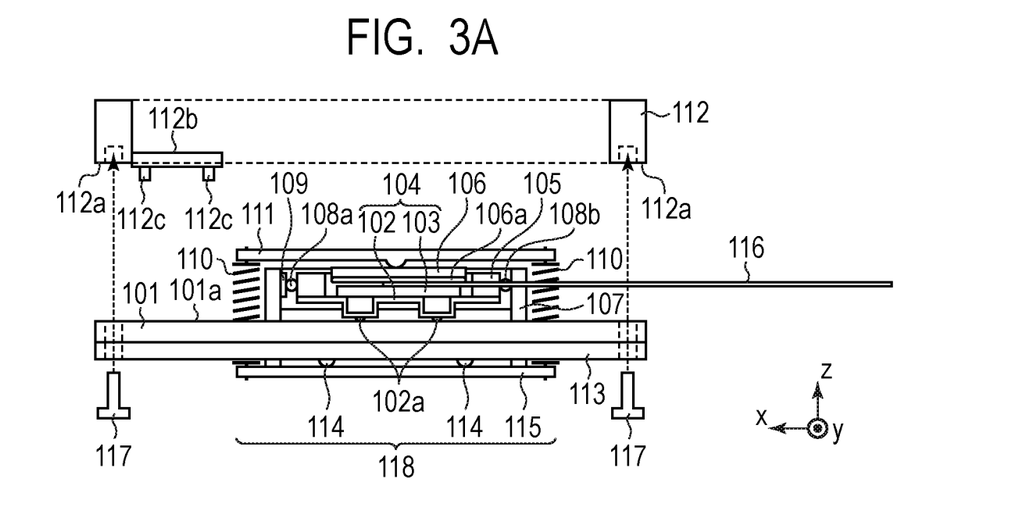
FIG. 3A and FIG. 3B are views for illustrating a method of assembling the vibration wave motor (100).
Figure 3B:
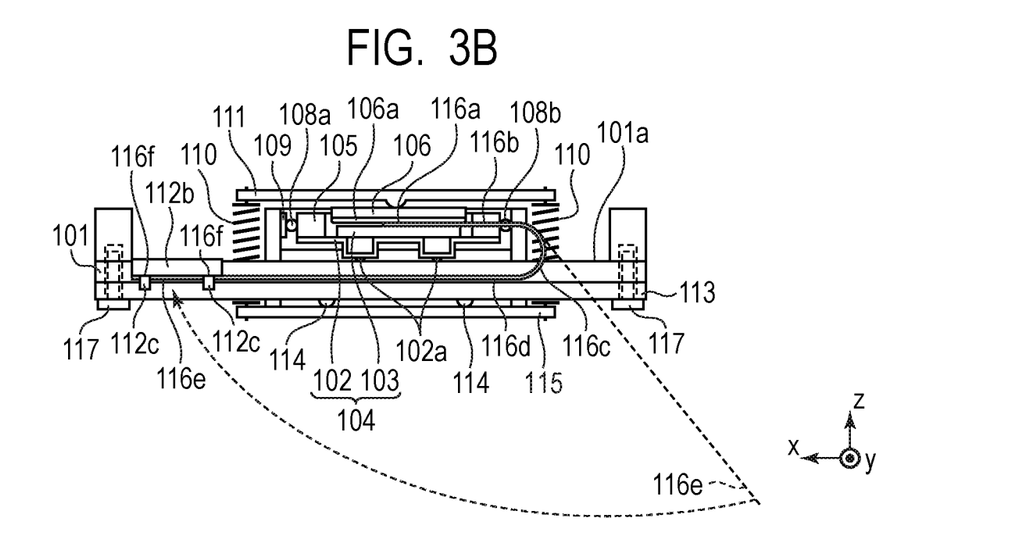

Next, the structure and effects of main portions of the present disclosure are described. FIG. 3A and FIG. 3B are views for illustrating a method of assembling the vibration wave motor 100. FIG. 3A is a view for illustrating a process of fixing the friction member 101 retaining the movable portion 118 and the guide member 113 to the fixing member 112. First, the friction member 101 and the guide member 113 are positioned and retained with a jig or the like, and the movable portion 118 is assembled. At that time, the rolling balls 114 are sandwiched between the guide member 113 and the movable guide member 115. Then, the friction member 101 and the guide member 113 are brought into a state of being sandwiched between the movable guide member 115 and the urging member 111 by the pressurizing force of the plurality of springs 110. The friction member 101 retaining the movable portion 118 and the guide member 113 is fixed to the fixing portions 112a of the fixing member 112 with the screws 117.

In a case in which the movable portion 118 is assembled after the friction member 101 and the guide member 113 are fixed to the fixing member 112, portions of the movable guide member 115 and the urging member 111 at which the springs 110 are assembled are surrounded by the fixing member 112. As a result, workability at the time of engaging the plurality of springs 110 to the movable guide member 115 and the urging member 111 becomes very poor. However, in the vibration wave motor 100, as illustrated in FIG. 3A, before the friction member 101 is fixed to the fixing member 112, the movable portion 118 is assembled to the friction member 101. As a result, the portions of the movable guide member 115 and the urging member 111, at which the springs 110 are assembled, are not surrounded by the fixing member 112, and the plurality of springs 110 can be assembled in an open state. As described above, the workability at the time of engaging the plurality of springs 110 to the movable guide member 115 and the urging member 111 can be improved.

FIG. 3B is a view for illustrating a process of fixing a fixed portion 116e of the flexible substrate 116 to a flexible substrate-fixing portion 112b of the fixing member 112. In the vibration wave motor 100, after the friction member 101 retaining the movable portion 118 and the guide member 113 is fixed to the fixing portions 112a of the fixing member 112, the fixed portion 116e of the flexible substrate 116 is fixed to the flexible substrate-fixing portion 112b.

At that time, the flexible substrate-fixing portion 112b has a surface in the −Z-direction opposite to a surface, on which the vibrator 104 is disposed, as a surface on which the flexible substrate 116 is fixed, and the fixed portion 116e is fixed to the surface of the flexible substrate-fixing portion 112b in the −Z-direction with a double-sided tape or the like. The flexible substrate-fixing portion 112b has a plurality of flexible substrate-positioning protrusions 112c protruding in the Z-direction, and the flexible substrate-positioning protrusions 112c are engaged with holes 116f formed in the flexible substrate 116. Accordingly, a position of the fixed portion 116e is determined in an XY-plane direction with respect to the flexible substrate-fixing portion 112b.

In the related art, it is required that a flexible substrate be fixed in a narrow space, which results in poor workability. Meanwhile, in the vibration wave motor 100, the flexible substrate 116 is arranged as indicated by dotted lines of FIG. 3B, and the fixed portion 116e is fixed to the surface of the flexible substrate-fixing portion 112b in the −Z-direction. The surface of the flexible substrate-fixing portion 112b in the −Z-direction is exposed to the outside. Therefore, the workability at the time of pasting the fixed portion 116e to the flexible substrate-fixing portion 112b is significantly improved.

Next, portions of the flexible substrate 116 and arrangement of the flexible substrate-fixing portion 112b are described. The flexible substrate 116 is joined to the piezoelectric element 103 at the joint portion 116a. The flexible substrate 116 has a first extending portion 116b extending from the joint portion 116a along the −X-direction. Further, the flexible substrate 116 has a bent portion 116c configured to reverse and turn back the first extending portion 116b from the −X-direction to the +X-direction, and a second extending portion 116d extending from the bent portion 116c along the +X-direction. The flexible substrate 116 also has the fixed portion 116e with which the flexible substrate 116 is fixed to the flexible substrate-fixing portion 112b. The second extending portion 116d is disposed between the bent portion 116c and the fixed portion 116e. Note that the flexible substrate-fixing portion 112b is disposed between the first extending portion 116b and the fixed portion 116e (second extending portion 116d) in the Z-direction.

The flexible substrate 116 is press-joined to the vibrator 104 at the joint portion 116a, and the fixed portion 116e is fixed to the fixing member 112. When the vibrator 104 is moved in the X-direction, the bent portion 116c, which is configured to reverse the extending direction of the flexible substrate 116, of the flexible substrate 116 is moved in the X-direction so that relative positional shift between the vibrator 104 and the fixing member 112 can be absorbed. With that configuration, even when the vibrator 104 is moved in the X-direction, a tensile force caused by the movement is not applied to the flexible substrate 116.

Figure 4:
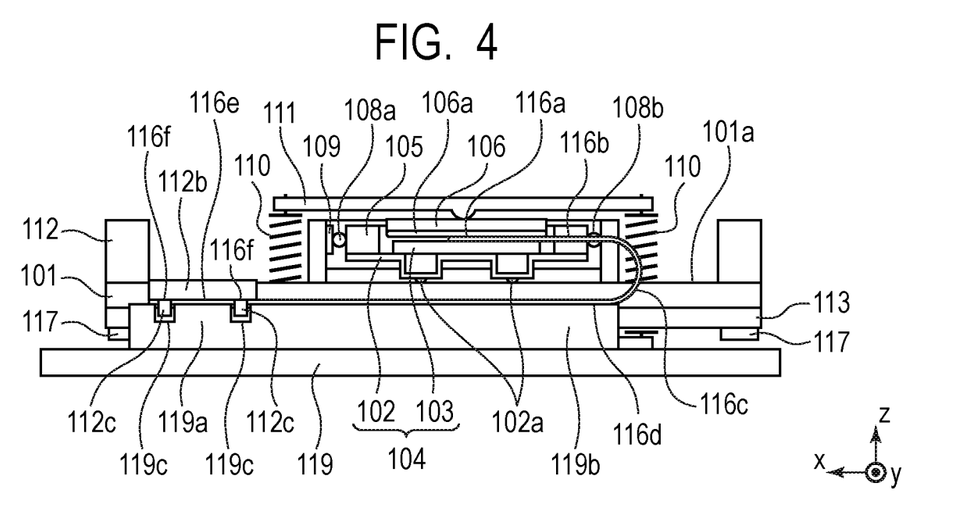
FIG. 4 is a view for illustrating a position of a second fixing member (119).

FIG. 4 is an explanatory view for illustrating the second fixing member 119 which retains the fixing member 112. A second flexible substrate-fixing portion 119a is formed at a position, which faces the flexible substrate-fixing portion 112b, of the second fixing member 119. The fixed portion 116e of the flexible substrate 116 is sandwiched between the surface of the flexible substrate-fixing portion 112b in the −Z-direction and the surface of the second flexible substrate-fixing portion 119a in the +Z-direction. Further, holes 119c are formed at positions corresponding to the flexible substrate-positioning protrusions 112c, and the holes 116f in the flexible substrate 116 are engaged to the flexible substrate-positioning protrusions 112c. That configuration exerts an excellent effect in a case in which the double-sided tape fixing the fixed portion 116e to the flexible substrate-fixing portion 112b is peeled off by a restoring force of the bent portion 116c. That is, the fixed portion 116e is engaged with the flexible substrate-positioning protrusions 112c via the holes 116f, and is sandwiched between the surface of the flexible substrate-fixing portion 112b in the −Z-direction and the surface of the second flexible substrate-fixing portion 119a in the +Z-direction so that the fixed portion 116e is not shifted.

The second flexible substrate-fixing portion 119a extends in the X-direction. Further, a flexible substrate-abutment portion 119b, which is brought into abutment against the second extending portion 116d in the Z-direction, is formed along the X-direction in the second fixing member 119. With the restoring force of the bent portion 116c, the second extending portion 116d is liable to shift in the −Z-direction, but the second extending portion 116d is received on the flexible substrate-abutment portion 119b so that a shape of the bent portion 116c can be maintained. Thus, the second fixing member 119 has the second flexible substrate-fixing portion 119a and the flexible substrate-abutment portion 119b to perform a function to fix the flexible substrate 116 and a function to receive the restoring force of the bent portion 116c in the Z-direction.

Figure 5B:
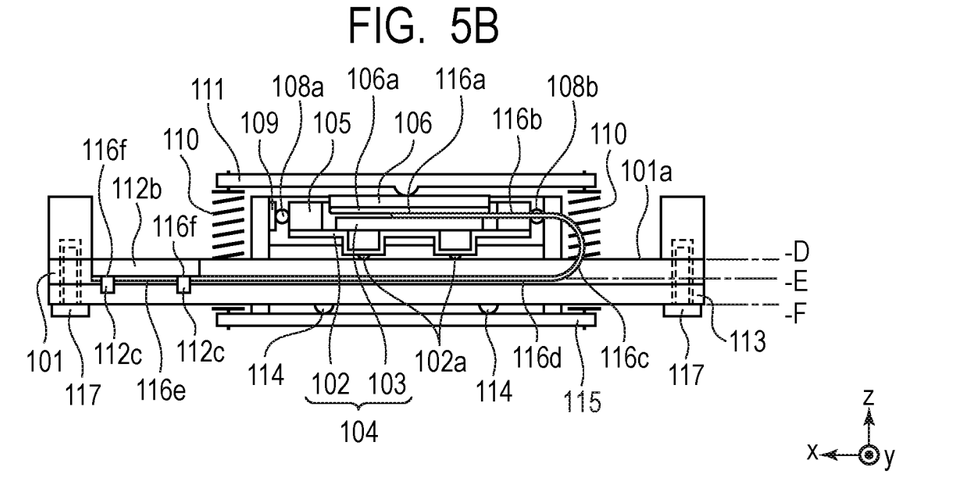

FIG. 5A and FIG. 5B are explanatory views for illustrating a position of the flexible substrate-fixing portion 112b. FIG. 5A is a view seen from the +X-direction, and FIG. 5B is a view seen from the +Y-direction. First, the position in the Y-direction is described. In the Y-direction, the plurality of springs 110 are disposed on both sides of the friction member 101. Here, the positions of the plurality of springs 110 in the Y-direction are represented by a position +A and a position −A. Further, the joint portion 116a configured to join the flexible substrate 116 to the piezoelectric element 103 is disposed at a center of the friction member 101 in the Y-direction. Here, a position of the joint portion 116a in the Y-direction is represented by a position B.

The first extending portion 116b, the bent portion 116c, the second extending portion 116d, the fixed portion 116e of the flexible substrate 116, and the flexible substrate-fixing portion 112b of the fixing member 112 are disposed outside in the +Y-direction, which is further outside the springs 110 on the +Y-direction side, that is, outside the plurality of springs 110. That configuration is formed in which the first extending portion 116b extends from the joint portion 116a along the −X-direction and further extends apart in the Y-direction, and the first extending portion 116b is reversed and turned back in the +X-direction by the bent portion 116c. Here, the positions of the first extending portion 116b, the bent portion 116c, the second extending portion 116d, the fixed portion 116e, and the flexible substrate-fixing portion 112b of the fixing member 112 are represented by +C.

In the vibration wave motor 100, in the Y direction, the joint portion 116a is disposed at the position B inside the position +A and the position −A of the plurality of springs 110, and the flexible substrate-fixing portion 112b is disposed at the position +C outside the position +A of the plurality of springs 110. The joint portion 116a of the flexible substrate 116 is fixed to the piezoelectric element 103 on a movable side, and the fixed portion 116e is fixed to the flexible substrate-fixing portion 112b on a fixed side, and the bent portion 116c moves in the X-direction. At that time, in a case in which the first extending portion 116b, the bent portion 116c, the second extending portion 116d, the fixed portion 116e, and the flexible substrate-fixing portion 112b are provided in a region surrounded by the urging member 111, the plurality of springs 110, and the movable guide member 115, a size in the Z-direction determined by being sandwiched between the urging member 111 and the movable guide member 115 and a size in the Y-direction determined by being sandwiched between the plurality of springs 110 are increased. As a result, an area projecting on a YZ-plane of the movable portion 118 is increased, and the vibration wave motor 100 is increased in size.

To cope with that problem, as illustrated in FIG. 5A, in the Y-direction, the joint portion 116a is disposed inside the plurality of springs 110, and the fixed portion 116e and the flexible substrate-fixing portion 112b are disposed outside the plurality of springs 110. With that configuration, downsizing of the vibration wave motor 100 is achieved.

Next, the positions in the Z-direction are described. A rolling guide mechanism including the movable guide member 115, the guide member 113, and the rolling balls 114 is disposed at a position in the −Z-direction opposite to the sliding surface 101a. A position of the sliding surface 101a in the Z-direction is represented by a position −D, a position of the fixed portion 116e in the Z-direction is represented by a position −E, and a position of the rolling balls 114 in the Z-direction is represented by a position −F. In the Z-direction, the position −E is located between the position −D and the position −F.

In the related-art ultrasonic motor, in the Z-direction, members and fixing portions are overlapped with each other so that the ultrasonic motor is increased in size in the Z-direction. However, in the vibration wave motor 100 of the present disclosure, both the rolling guide mechanism and the fixed portion 116e of the flexible substrate 116 are disposed on the side (−Z-direction) opposite to the vibrator 104 on the sliding surface 101a. Further, the rolling guide mechanism, the fixed portion 116e of the flexible substrate 116, and the flexible substrate-fixing portion 112b are disposed to be shifted in the Y-direction. With that configuration, the rolling guide mechanism, the fixed portion 116e of the flexible substrate 116, and the flexible substrate-fixing portion 112b are overlapped in the Z-direction with the result that the vibration wave motor 100 is prevented from being increased in size in the Z-direction.

In the vibration wave motor 100, the rolling guide mechanism is disposed in the −Z-direction of the friction member 101, and the fixed portion 116e of the flexible substrate 116 is disposed outside the plurality of springs 110 in the +Y-direction so that a layout of each component is optimized. With that configuration, downsizing of the vibration wave motor 100 is achieved.

As described above, in the vibration wave motor 100 of the present disclosure, in the Z-direction which is the pressurizing direction of the springs 110, the flexible substrate-fixing portion 112b of the fixing member 112 is disposed between the first extending portion 116b and the fixed portion 116e of the flexible substrate 116. Further, the flexible substrate 116 is fixed to the surface on the side (−Z-direction) opposite to the surface on the side (+Z-direction) on which the vibrator 104 on the flexible substrate-fixing portion 112b is disposed. With such a configuration, it is possible to provide the vibration wave motor 100 having improved workability at the time of pasting the fixed portion 116e on the flexible substrate-fixing portion 112b.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-117034, filed Jun. 20, 2018, which is hereby incorporated by reference herein in its entirety.

What is claimed is:

1. A vibration wave motor comprising:
 a vibrator including a piezoelectric element and a vibrating plate;
 a friction member having a sliding surface with which the vibrator is held in pressure-contact in a first direction by a pressurizing force;
 a guide member, which is disposed on a side opposite to a side being the sliding surface of the friction member, and is configured to guide relative movement between the vibrator and the friction member;
 a flexible substrate configured to apply voltage to the vibrator; and
 a fixing member configured to fix the friction member, the guide member, and the flexible substrate,
 wherein the vibrator and the friction member move relative to each other in a second direction,
 wherein the fixing member includes a flexible substrate-fixing portion configured to fix the flexible substrate,
 wherein the flexible substrate includes:
  a joint portion to be joined to the piezoelectric element;
  a first extending portion extending along the second direction;
  a bent portion configured to reverse and turn back the first extending portion; and
  a fixed portion to be fixed to the flexible substrate-fixing portion, and
 wherein the flexible substrate is fixed on a surface of the flexible substrate-fixing portion provided in a direction opposite to a direction in which the vibrator is brought into pressure-contact with the friction member.

2. The vibration wave motor according to claim 1, wherein the flexible substrate-fixing portion is disposed between the first extending portion and the fixed portion in the first direction.

3. The vibration wave motor according to claim 1, wherein the first extending portion extends along the second direction to be apart from the joint portion in a direction orthogonal to the first direction and the second direction, and the bent portion is configured to reverse and turn back the first extending portion in the second direction.

4. The vibration wave motor according to claim 1,
wherein the flexible substrate includes a second extending portion extending along the second direction between the bent portion and the fixed portion,
wherein the flexible substrate-fixing portion includes a flexible substrate-positioning protrusion protruding in the first direction, and the flexible substrate-positioning protrusion engages with a hole formed in the fixed portion,
wherein the vibration wave motor further includes a second fixing member configured to retain the fixing member,
wherein the second fixing member facing the flexible substrate-fixing portion has a second flexible substrate-fixing portion,
wherein the fixed portion is sandwiched between the flexible substrate-fixing portion and the second flexible substrate-fixing portion, and
wherein the second flexible substrate-fixing portion extends in the second direction, and the second flexible fixing portion has a flexible substrate-abutment portion which is brought into abutment against the second extending portion in the first direction.

5. The vibration wave motor according to claim 4, wherein, in a direction orthogonal to the first direction and the second direction, a plurality of springs are disposed on both sides of the friction member, the joint portion is disposed inside the plurality of springs, and the first extending portion, the bent portion, the second extending portion, the fixed portion, and the flexible substrate-fixing portion are respectively disposed outside the plurality of springs.

6. The vibration wave motor according to claim 1, further comprising:
a movable guide member which is movable in the second direction together with the vibrator; and
a rolling ball, which is disposed on a side opposite to the sliding surface, and is sandwiched between the guide member and the movable guide member by the pressurizing force,
wherein the flexible substrate-fixing portion is disposed between the sliding surface and the rolling ball in the first direction.

7. The vibration wave motor according to claim 1, wherein the vibrator is excited by application of the voltage, and the vibration wave motor comprises an ultrasonic wave motor.

8. A driving device comprising:
a vibration wave motor; and
a driven member driven by the vibration wave motor,
wherein the vibration wave motor includes:
a vibrator including a piezoelectric element and a vibrating plate;
a friction member having a sliding surface with which the vibrator is held in pressure-contact in a first direction by a pressurizing force;
a guide member, which is disposed on a side opposite to a side being the sliding surface of the friction member, and is configured to guide relative movement between the vibrator and the friction member;
a flexible substrate configured to apply voltage to the vibrator; and
a fixing member configured to fix the friction member, the guide member, and the flexible substrate,
wherein the vibrator and the friction member move relative to each other in a second direction,
wherein the fixing member includes a flexible substrate-fixing portion configured to fix the flexible substrate,
wherein the flexible substrate includes:
a joint portion to be joined to the piezoelectric element;
a first extending portion extending along the second direction;
a bent portion configured to reverse and turn back the first extending portion; and
a fixed portion to be fixed to the flexible substrate-fixing portion, and
wherein the flexible substrate is fixed on a surface of the flexible substrate-fixing portion provided in a direction opposite to a direction in which the vibrator is brought into pressure-contact with the friction member.

* * * * *